UNITED STATES PATENT OFFICE.

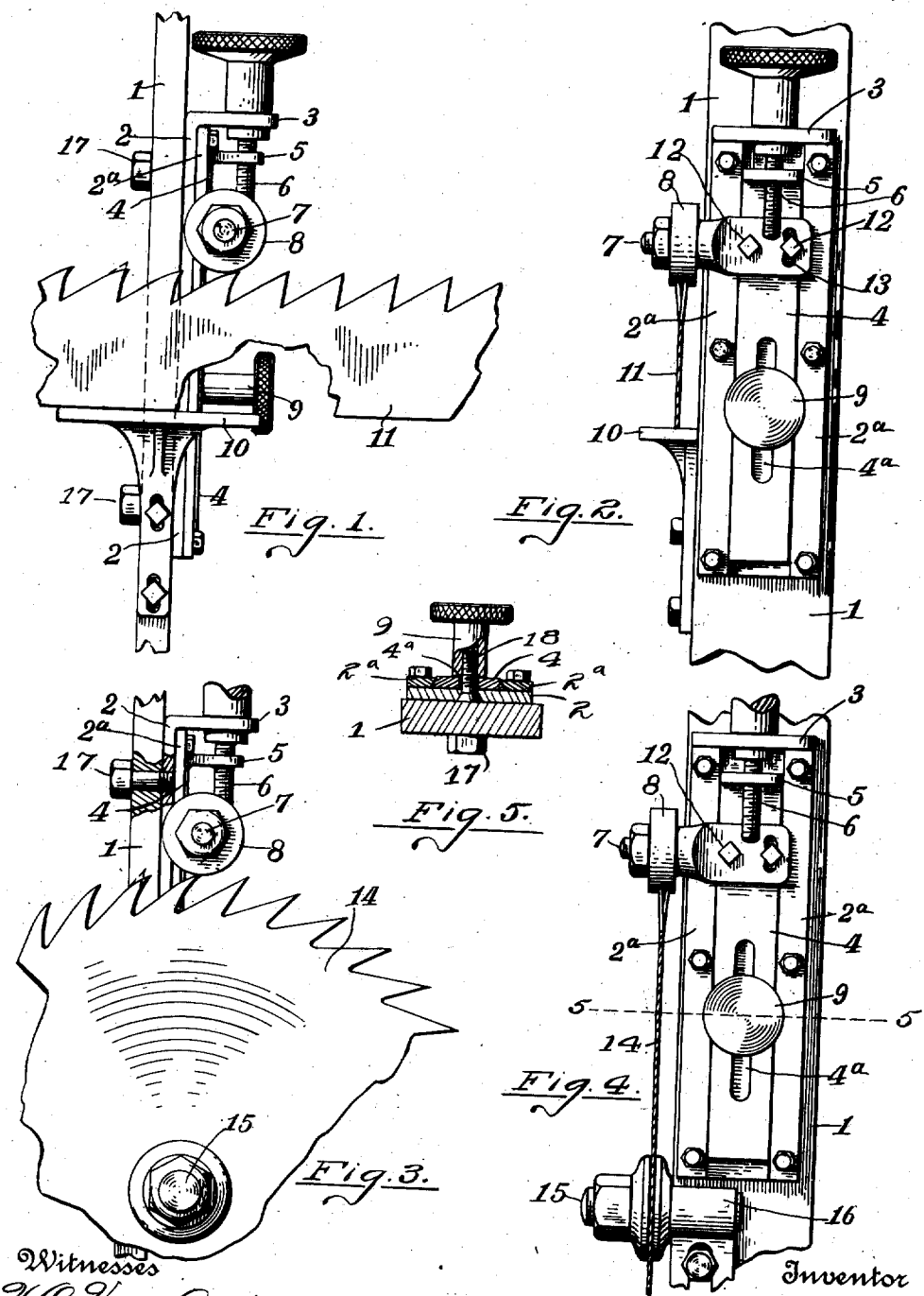

HAYDEN W. SAGE, OF GRAND RAPIDS, MICHIGAN, ASSIGNOR TO FRANK A. BALDWIN AND VICTOR M. TUTHILL, OF GRAND RAPIDS, MICHIGAN.

TOOTH-BENDING ATTACHMENT.

989,727.    Specification of Letters Patent.    Patented Apr. 18, 1911.

Application filed September 11, 1909. Serial No. 517,296.

*To all whom it may concern:*

Be it known that I, HAYDEN W. SAGE, a citizen of the United States of America, residing at Grand Rapids, in the county of Kent and State of Michigan, have invented certain new and useful Improvements in Tooth-Bending Attachments; and I do hereby declare the following to be a full, clear, and exact description of the invention, such as will enable others skilled in the art to which it appertains to make and use the same.

My invention relates to improvements in tooth bending attachments for saw filing machines, and its object is to provide a device that may be easily attached to any ordinary saw filing machine, and can be used equally well on either band or circular saws, and to provide the same with various new and useful features as hereinafter more fully described and particularly pointed out in the claims.

This device is used to bend the points of the saw teeth toward the next adjacent tooth, and in the direction of the plane of the saw blade, thus giving them a better angle to cut the wood, and also doing away with waste of metal in filing as only the point of the tooth which has been bent down will need to be filed away in order to sharpen the saw.

Referring to the accompanying drawings: Figure 1 is a side elevation of the device applied to a band saw; Fig. 2 is a front elevation of the same; Fig. 3 is a side elevation with the upper portion broken away, and a circular saw shown in operative position; Fig. 4 is a front elevation of the device as shown in Fig. 3; and, Fig. 5 is a horizontal section on the line 5—5 of Fig. 4.

Like numbers refer to like parts in all of the figures.

1 represents any convenient portion of the frame of a saw filing machine or other support.

2 is the bed plate fastened to the support 1 by cap screws 17. The upper part 3 of this bed plate 2 is bent outward at right angles and forms a support for the adjusting screw 6 which is journaled in the same.

A slide 4 having an outwardly extending portion 5 is vertically slidable in a dovetailed groove which is formed by the plates 2ª which have their inner edges oppositely beveled and are bolted to the bed plate 2. The outwardly extended portion 5 of the slide 4 is tapped to receive the screw 6 which vertically adjusts the slide. A threaded stud 18 is fastened to the bed plate 2 and extends through a slot 4ª in the slide 4, and a clamping nut 9 screws on to the stud 18, and holds the slide 4 in any desired adjustment. A journal block 7 is adjustably fastened to the slide 4 by screws 12, a slot 13 being provided in the block 7, through which slot one of the bolts 12 is inserted to allow the block to be adjusted.

8 is a hardened steel roller which contacts the points of the teeth of the saw at right angles to the plane of the saw blade and bends the same in the direction of the next adjacent tooth as it is drawn under the same. This roller is supported by the block 7 and journaled on the same.

In Fig. 1 a band saw 11 is shown, the lower edge of which is supported by a table 10, which is bolted to the frame 1 of the saw filing machine and is adjustable thereon. This table holds the saw teeth against the under side of the roller 8, and as the saw is drawn under the roller, the teeth are bent in the direction of the plane of the saw, and to the desired shape. They can be bent more or less by adjusting the slide 4 up or down.

In Fig. 3 a circular saw 14 is shown which is supported by an arbor 15 which is rotative in a bracket 16 bolted to the frame 1 or support, and is vertically adjustable thereon. This holds the teeth of the saw against the under side of the roller 8, and as the saw is rotated, the teeth are bent.

The specific modification adapting the device to operate upon a circular saw is not herein claimed but is reserved for a separate application in accordance with the requirement of the Office for division of this application.

Having thus described my invention, what I claim is:

1. A tooth bending device, comprising a rolling member having a smooth cylindrical periphery, means for supporting the rolling member, and means for movably holding the saw in engagement with the same with the periphery of the rolling member at right angles to the plane of the saw.

2. A tooth bending device, comprising a roller adapted to engage the ends of saw teeth at right angles to the plane of the saw and bend them in the direction of the next adjacent tooth as the saw is moved beneath the roller, a slide supporting the roller and adjustable in a groove in the bed plate, a bed plate having a groove to receive the slide, and means for adjusting the slide in the bed plate.

3. A tooth bending device, comprising a bed plate having a groove, a slide adjustable in the groove in the bed plate, means for adjusting the slide in the groove, means for clamping the slide to the bed plate, a roller supported by the slide and adjustable thereon and also adapted to engage the ends of saw teeth at right angles to the plane of the saw as the saw is moved beneath the roller, and a table adapted to support a band saw and force the teeth of the saw against the roller.

4. In a device of the class described, the combination of a bed plate adapted to be fastened to a convenient support, a dovetail groove in the bed plate, a slide movable in the dovetail groove, means for vertically adjusting the slide in the groove, means for clamping the slide to the bed plate, a journal block supported on the slide and adjustable thereon, a roller journaled on the journal block and adapted to engage the ends of the saw teeth, a table attached to the said support and vertically adjustable thereon and also adapted to support the lower edge of a band saw and force the teeth of the same against the under side of the roller.

In testimony whereof I affix my signature in presence of two witnesses.

HAYDEN W. SAGE.

Witnesses:
JAMES B. GRAY,
ROBERT WEMMER.

---

Copies of this patent may be obtained for five cents each, by addressing the "Commissioner of Patents, Washington, D. C."